(12) United States Patent
Huang et al.

(10) Patent No.: US 9,315,207 B2
(45) Date of Patent: Apr. 19, 2016

(54) VEHICLE SECURING SYSTEM

(71) Applicant: HON HAI PRECISION INDUSTRY CO., LTD., New Taipei (TW)

(72) Inventors: Chen-Wei Huang, New Taipei (TW); Po-Heng Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/558,952

(22) Filed: Dec. 3, 2014

(65) Prior Publication Data

US 2016/0083003 A1 Mar. 24, 2016

(30) Foreign Application Priority Data

Sep. 19, 2014 (TW) .................................. 103132535

(51) Int. Cl.
*B62D 1/183* (2006.01)
*B60R 25/102* (2013.01)
*B60R 25/00* (2013.01)

(52) U.S. Cl.
CPC .............. *B62D 1/183* (2013.01); *B60R 25/007* (2013.01); *B60R 25/102* (2013.01)

(58) Field of Classification Search
CPC ..... B62D 1/183; B60R 25/007; B60R 25/102
See application file for complete search history.

(56) References Cited

U.S. PATENT DOCUMENTS

| | | | | |
|---|---|---|---|---|
| 7,448,285 B2 * | 11/2008 | Nakatani | .................. | B62D 5/04 439/296 |
| 8,981,768 B2 * | 3/2015 | Choi | ....................... | F16D 3/223 324/207.2 |
| 2015/0291032 A1 * | 10/2015 | Kim | ....................... | B60K 37/06 701/36 |
| 2015/0321641 A1 * | 11/2015 | Abou Mahmoud | . | B60R 25/2018 701/2 |

FOREIGN PATENT DOCUMENTS

| | | | | | |
|---|---|---|---|---|---|
| DE | 10315385 A1 | * | 10/2004 | ............. | B62D 1/183 |
| FR | 2965536 A1 | * | 4/2012 | ............. | B62D 1/183 |
| GB | 974783 A | * | 11/1964 | ............. | B60Q 1/425 |
| SE | WO 2010050882 A1 | * | 5/2010 | ............... | B62D 1/18 |

* cited by examiner

*Primary Examiner* — Nicole Verley
(74) *Attorney, Agent, or Firm* — Novak Druce Connolly Bove + Quigg LLP

(57) ABSTRACT

A vehicle securing system includes a steer wheel module. The steer wheel module has a steer wheel, a steer wheel shaft connected to the steer wheel, the steer wheel shaft having a plurality of joints, and an electric wire received in the steer wheel shaft. The steer wheel shaft is capable of bending at the joints. At least one of the plurality of joints includes an electrical connector, and the electrical connector is configured to control the electric wire shift between conducting state and non-conducting state.

10 Claims, 3 Drawing Sheets

VEHICLE SECURING SYSTEM

FIELD

The subject matter herein generally relates to a vehicle securing system.

BACKGROUND

Automobiles are typically secured using locks on the doors which require a key to gain access to the cabin of the automobile. Locks are also used on the ignition to make it more difficult for an unauthorized user to start the automobile. Although these mechanisms may provide some degree of security, they are easily bypassed. For this reason, automobiles are often broken into and/or stolen.

BRIEF DESCRIPTION OF THE DRAWINGS

Implementations of the present technology will now be described, by way of example only, with reference to the attached figures.

DETAILED DESCRIPTION

Figure 1:
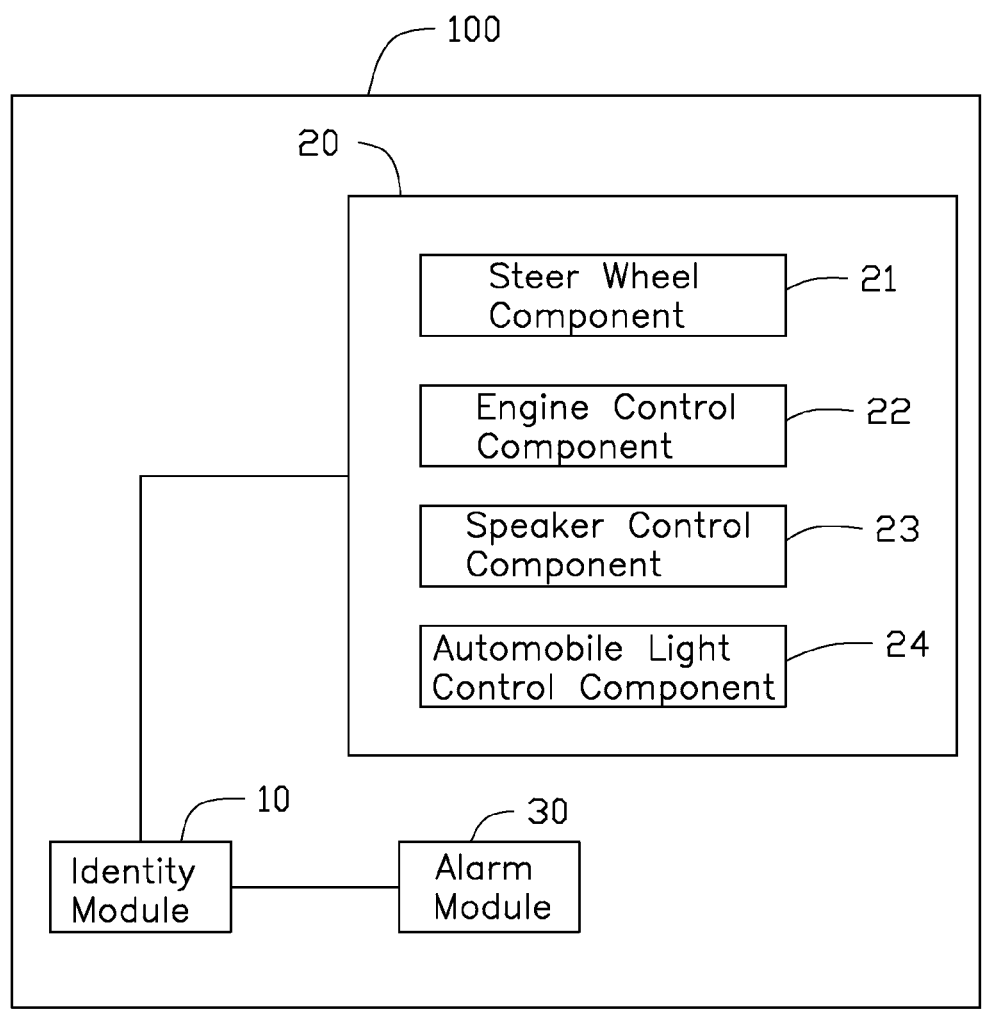
FIG. 1 is a diagram of one embodiment of a vehicle securing system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising" when utilized, means "including, but not necessarily limited to"; it specifically indicates open-ended inclusion or membership in the so-described combination, group, series and the like.

The present disclosure is described in relation to a vehicle securing system mounted in a vehicle.

FIG. 1 illustrates that a vehicle securing system 100 can include an identity module 10, a steering wheel module 20, and an alarm module 30. The steering wheel module 20 and the alarm module 30 can be electrically connected to the identity module 10. The identity module 10 can be configured to identify user's information and start the steering wheel module 20. The steering wheel module 20 can be configured to control driving directions. The alarm module 30 can be configured to send alarm signals when exceptions occur.

The identity module 10 can include an identity procedure. The identity procedure can be used to receive an identification code input by user and identify the identity code. If the identification code is right, the identity module 10 can transmit a start signal to the steering wheel module 20. If the identification code can not be identified, the identity module 10 can transmit a start signal to the alarm module 30, and then the alarm module 30 can send alarm signals.

In at least one embodiment, the steering wheel module 20 can include a steering wheel component 21, an engine control component 22, a speaker control component 23, and an automobile light control component 24. The steering wheel component 21 can be configured to control the driving directions. The engine control component 22 can be configured to start and shut down an engine of the vehicle. The speaker control component 23 can be configured to control the speaker, and the automobile light control component 24 can be configured to control the automobile light. In other embodiments, the steering wheel module 20 can include other control components.

In at least one embodiment, the alarm module 30 can give out an audible and visual alert when the identification code is incorrect. At the same time, the alarm module 30 can send alarm signals to a mobile terminal of an owner of the vehicle. If the owner has registered the information of the vehicle in a police office, the alarm module 30 can send alarm signals to the police office.

Figure 2:
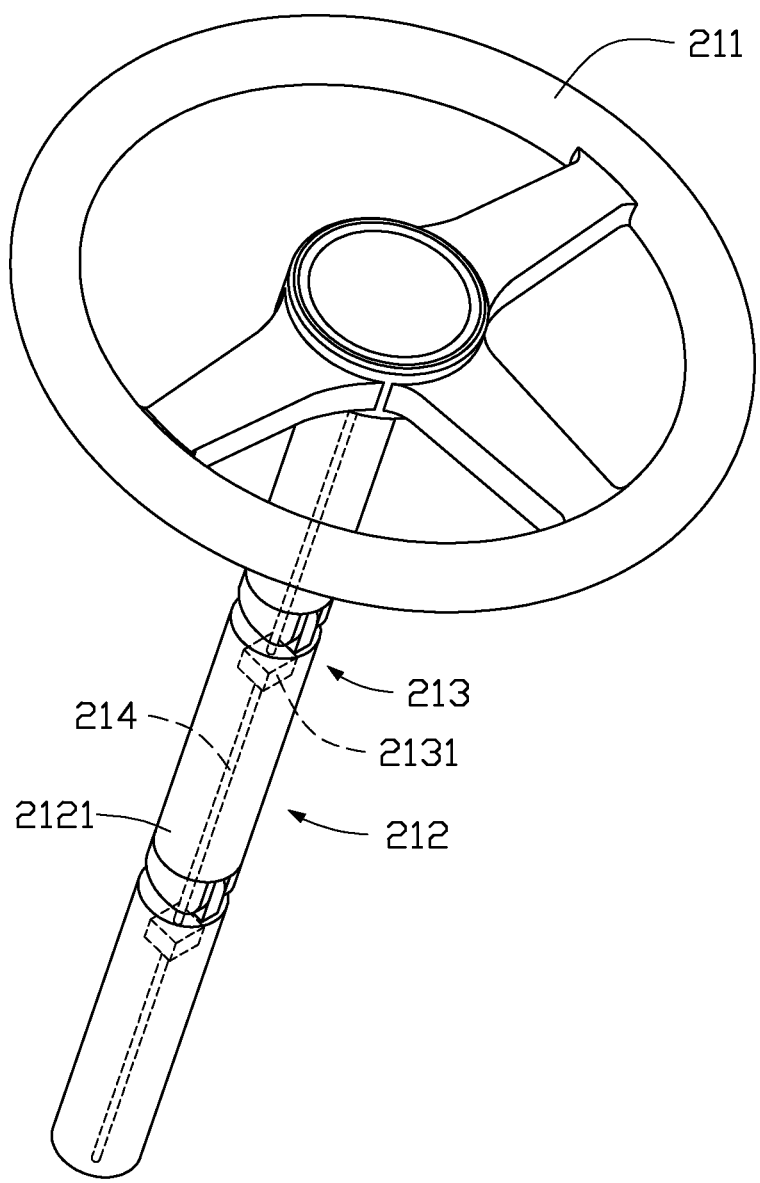
FIG. 2 is an isometric view of a steering wheel module of the vehicle securing system in FIG. 1.

FIG. 2 illustrates that the steer wheel component 21 can include a steer wheel 211, a steer wheel shaft 212, a plurality of joints 213 arranged on the steer wheel shaft 22, and at least one electric wire 214. The steer wheel shaft 212 can be connected to the steer wheel 211. The steer wheel shaft 212 can be bent at the joints 213 and a plurality of shaft sections 2121 can be formed divided by the joints 213. Each of the joints 213 can include an electrical connector 2131. The electrical connectors 2131 can be connected to the electric wire 214 and configured to control the electric wire 214 shift between conducting state and non-conducting state.

In at least one embodiment, each of the engine control component 22, the speaker control component 23, and the automobile light control component 24 can includes a button (not shown). One end of the electric wire 214 can be electrically connected to the buttons, and the other end of the electric wire 214 can be electrically connected to the engine, the speaker, and the automobile light.

The electric wire 214 can be received in the steer wheel shaft 212 and configured to transmit control signals transmitted by the engine control component 22, the speaker control component 23, and the automobile light control component 24. When the steer wheel shaft 212 is not bent, the electrical connectors 2131 can make the electric wire 214 in all of the shaft sections 2121 electrically connected. The electric wire 214 is in a conducting state and can transmit the control signals transmitted by the above control components.

Figure 3:
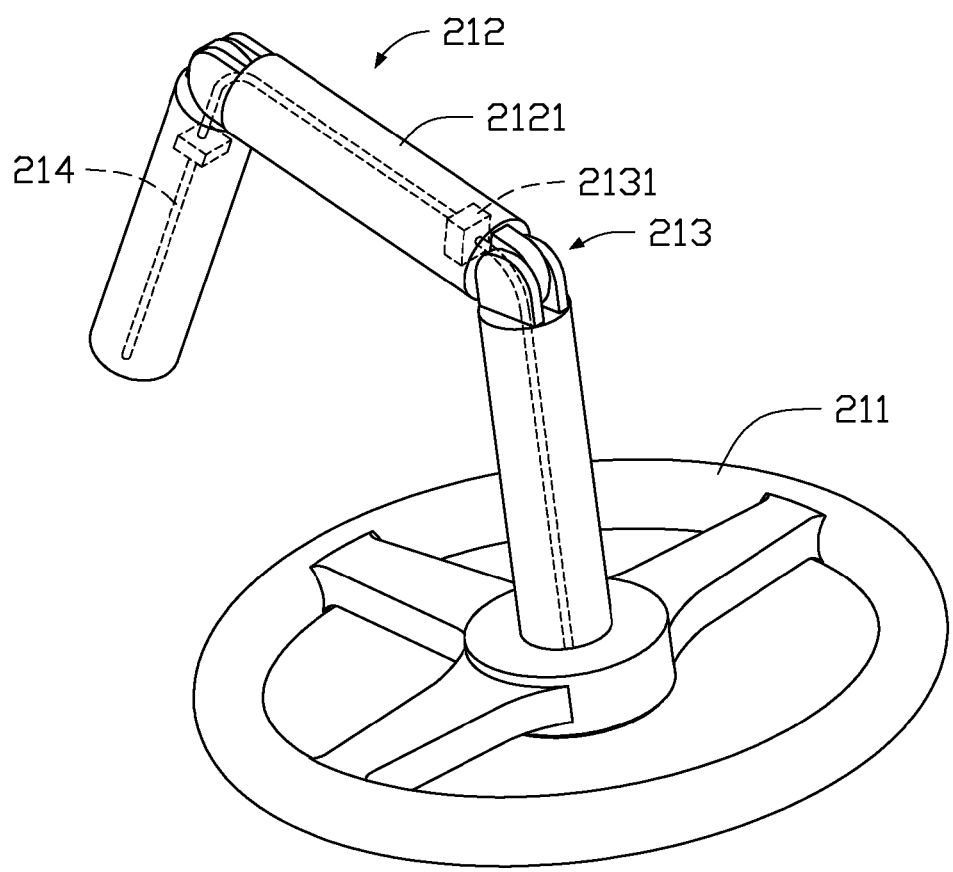
FIG. 3 is an isometric view of the steering wheel module in FIG. 1 in another state.

FIG. 3 illustrates that the steer wheel shaft 212 can be bent at one or more of the joints 213, and the electrical connectors 2131 can make the electric wire 214 in the shaft sections 2121 disconnected. At this time, the electric wire 214 is in a non-conducting state and can not transmit the control signals, so the user can not take control of the vehicle.

In at least one embodiment, the steer wheel shaft 212 can bend at the a plurality of the joints 213, so the steer wheel shaft 212 can be wholly received in a car body. Therefore, when the vehicle is in a shutdown condition, an inner space of the vehicle can be increased.

In other embodiments, the identify module 10 can be replaced by a mechanical lock, and users can unlock the vehicle by a key corresponding to the mechanical lock.

An example method of using the vehicle securing system 100 is provided as follows.

When the user leaves the vehicle, the vehicle securing system is started, the steer wheel shaft 212 can be bent and the electric wire 214 can be disconnected.

When the user want to unlock the vehicle, the user can input an identification code to the identify module 10. If the identification code is right, the steer wheel module 20 can be started. The steer wheel 211 can move out of the receiving portion of the vehicle, and the steer wheel shaft 212 can be straight. The electrical connectors 2131 can make the electric wire 214 in all of the shaft sections electrically connected, and the electric wire 214 can transmit the control signals. If the identification code is incorrect, the alarm module 30 can be started and send alarm signals.

In practical application, the users can have numerous chances to input the identification code, so the vehicle securing system 100 can prevent accidental operation.

The identify module 10 can send start signals to the steer wheel module 20 only if the identification code input by the user is right, so a thief can not control the steer wheel module 20. Moreover, the steer wheel shaft 212 can be bent at the joints 213, and the electrical connector 2131 can control the electric wire 214 shift in the conducting and non-conducting states. When the electric wire 214 is non-conducting, the steer wheel 211 can not be controlled by the user. Therefore, the vehicle can be secured.

The embodiments shown and described above are only examples. Many details are often found in the art such as the other features of a vehicle securing system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including, the full extent established by the broad general meaning of the terms used in the claims. It will therefore be appreciated that the embodiments described above may be modified within the scope of the claims.

What is claimed is:

1. A vehicle securing system comprising:
   a steer wheel module, the steer wheel module having:
   a steer wheel,
   a steer wheel shaft connected to the steer wheel, the steer wheel shaft having a plurality of joints, and
   an electric wire received in the steer wheel shaft;
   wherein the steer wheel shaft is capable of bending at the joints;
   at least one of the plurality of the joints includes an electrical connector;
   and the electrical connector is configured to control the electric wire shift between conducting state and non-conducting state.

2. The vehicle securing system as claimed in claim 1, wherein the steer wheel shaft includes a plurality of shaft sections divided by the joints.

3. The vehicle securing system as claimed in claim 2, wherein the electrical connector makes the electric wire in all of the shaft sections disconnected when the steer wheel shaft is bent.

4. The vehicle securing system as claimed in claim 2, wherein the electrical connector makes the electric wire in all of the shaft sections connected when the steer wheel shaft is straight.

5. The vehicle securing system as claimed in claim 1, wherein the vehicle securing system further comprises an identity module electrically connected to the steer wheel module, and the identity module is configured to identify users information.

6. The vehicle securing system as claimed in claim 5, wherein the identity module includes an identity procedure, and the identity procedure is configured to identity an identification code input by user.

7. The vehicle securing system as claimed in claim 5, wherein the vehicle securing system further comprises an alarm module electrically connected to the identity module, and the alarm module is configured to transmit alarm signals when the identification code is wrong.

8. The vehicle securing system as claimed in claim 7, wherein the alarm module is configured to transmit signals to an owner of the vehicle or a police office.

9. The vehicle securing system as claimed in claim 1, wherein the steer wheel module further includes an engine control component, a speaker control component, and an automobile light control component.

10. The vehicle securing system as claimed in claim 1, wherein the steer wheel is capable of receiving in a car body.

* * * * *